(12) United States Patent
Thucanakkenpalayam Sundararajan

(10) Patent No.: US 12,299,448 B2
(45) Date of Patent: May 13, 2025

(54) STORE INSTRUCTION MERGING WITH PATTERN DETECTION

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 119 days.

(21) Appl. No.: 17/956,034

(22) Filed: Sep. 29, 2022

(65) Prior Publication Data

US 2024/0111537 A1 Apr. 4, 2024

(51) Int. Cl.
*G06F 9/30* (2018.01)

(52) U.S. Cl.
CPC ...... *G06F 9/30189* (2013.01); *G06F 9/30043* (2013.01)

(58) Field of Classification Search
CPC .............. G06F 9/3004; G06F 9/30043; G06F 9/30145; G06F 9/3016; G06F 9/3017; G06F 9/30181; G06F 9/30189; G06F 9/34; G06F 9/345; G06F 9/3455; G06F 9/35; G06F 9/355; G06F 9/38; G06F 9/3854; G06F 9/3818; G06F 9/3824; G06F 9/3853
See application file for complete search history.

(56) References Cited

U.S. PATENT DOCUMENTS

| | | | |
|---|---|---|---|
| 4,805,098 A * | 2/1989 | Mills, Jr. ............. | G06F 13/1631 711/118 |
| 5,860,107 A * | 1/1999 | Patel ..................... | G06F 9/3824 712/E9.046 |
| 5,894,569 A * | 4/1999 | Arimilli .............. | G06F 9/30043 712/228 |
| 5,956,503 A * | 9/1999 | Arimilli .............. | G06F 9/30043 712/E9.046 |
| 6,266,747 B1 * | 7/2001 | Dahl ................... | G06F 9/30043 712/E9.046 |
| 2002/0184460 A1 * | 12/2002 | Tremblay .............. | G06F 9/3824 712/E9.046 |
| 2014/0143471 A1 * | 5/2014 | Moyer ................ | G06F 13/4059 710/310 |
| 2019/0163475 A1 * | 5/2019 | King ................... | G06F 9/30181 |
| 2024/0320009 A1 * | 9/2024 | Zhang .................. | G06F 9/3853 |

* cited by examiner

*Primary Examiner* — Andrew Caldwell
*Assistant Examiner* — Kasim Alli
(74) *Attorney, Agent, or Firm* — Patterson + Sheridan, LLP

(57) ABSTRACT

Merging store instructions for a memory includes receiving a first store instruction having a first address, and determining a first pattern based on a comparison of the first address and a second address of an entry within a buffer. Further, a size field of the entry is updated based on the first pattern. The first address of the first store instruction is merged with the second address within the entry to generate a merged instruction. The merged store instruction is communicated to the memory.

20 Claims, 12 Drawing Sheets

STORE INSTRUCTION MERGING WITH PATTERN DETECTION

TECHNICAL FIELD

The present disclosure relates to detecting patterns between store instructions for merging the store instructions into a common transaction

BACKGROUND

Processing systems buffer store instructions before transmitting the store instructions to a memory for completion. In many instances, to reduce the number of transactions with the memory, store instruction are merged, allowing multiple store instructions to be sent in one transaction. Store instructions are merged based on the addresses of the store instructions. For example, store instructions that are determined to have consecutive address are merged into a common store instruction. Merging the store instructions includes capturing the write mask of each entry in a store buffer that is used to store the merged store instructions.

SUMMARY

In one example, a method comprises receiving a first store instruction having a first address, and determining a first pattern based on a comparison of the first address and a second address of an entry within a buffer. The method further comprises updating a size field of the entry based on the first pattern. Further, the method includes merging the first address of the first store instruction with the second address within the entry to generate a merged instruction.

In one example, a processing system includes a memory, a processor that accesses the memory via a first store instruction, and buffer circuitry. The buffer circuitry receive the first store instruction having a first address from the processor, and determines a first pattern based on a comparison of the first address and a second address of an entry within a buffer. Further, the buffer circuitry updates a size field of a the entry of the buffer based on the first pattern, and merges the first address of the first store instruction with the second address of the entry to generate a merged instruction.

In one example, buffer circuitry receives a first store instruction having a first address, and determine a first pattern based on a comparison of the first address and a second address of an entry of a buffer location. Further, the buffer circuitry update a size field of the entry based on the first pattern, and merge the first address of the first store instruction with the second address within the entry to generate a merged instruction.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 illustrates example addresses of store instructions, according to one or more examples.

FIG. 10 illustrates example patterns of a write mask, according to one or more examples.

FIG. 11 illustrates example patterns of a write mask, according to one or more examples.

DETAILED DESCRIPTION

Aspects of the present disclosure relate to store instruction merging with pattern detection.

Processing systems merge store instructions to reduce the number of transactions used to complete the writes associated with the store instructions. The store instructions are merged based on the corresponding addresses. For example, store instructions that have consecutive addresses can be merged into a common store instruction. The store instructions are stored within entries of a buffer before the instructions are transmitted via transactions to a memory. In many instances, when store instructions are merged, the write mask of each entry within the buffer is captured. Accordingly, for an 8 entry store buffer, where each entry is associated with a 16 bit write mask, 128 bit register is used to store the write mask.

The processing system described herein utilizes buffer circuitry that determines write merging information (e.g., patterns) of the merged store instructions, and stores the write merging information for each entry. The write merging information is stored within the size information for each entry within a buffer of the buffer circuitry. The write merging information indicates the relationship between the addresses of the store instructions. For example, the write merging information indicates the size of the merged store instructions, and whether or not address gaps are present between the addresses of the store instructions. Accordingly, the amount of data stored to complete the merging of the store instructions is reduced. Reducing the amount of data stored during the merging process, uses less storage area, reducing the overall circuit area of the corresponding processing system, and the cost and size of the corresponding processing system.

Technical advantages of the present disclosure include, but are not limited to, using the size information within the entries of a store buffer to store an indication of the merging information used to merge store instructions. Accordingly, the size the memory used to store the information within the entries of the store buffer is reduced, reducing the circuit area and cost of the corresponding processing system.

Figure 1:
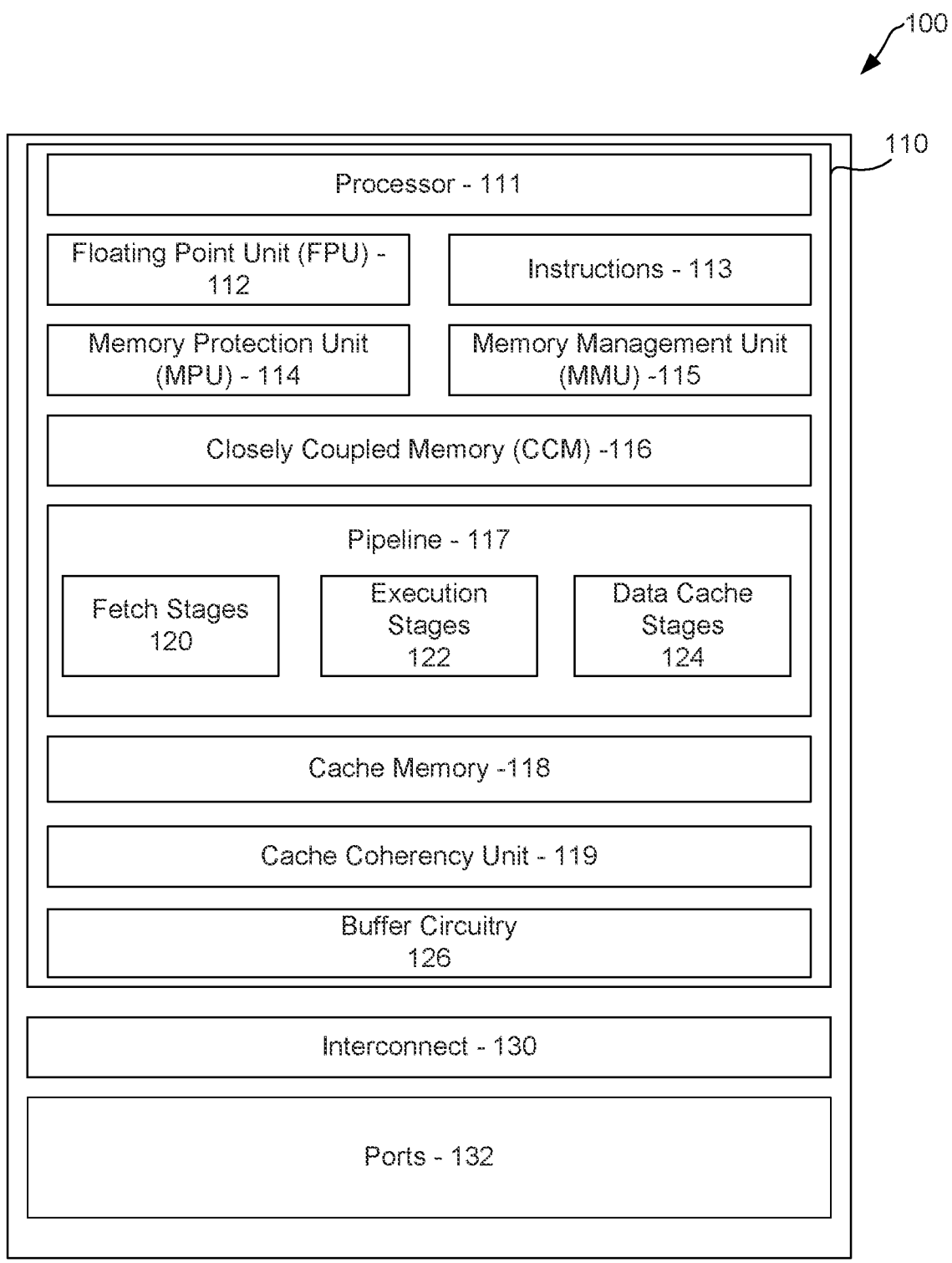
FIG. 1 illustrates an example processing system, according to one or more examples.

FIG. 1 illustrates a processing system 100, according to one or more examples. The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC).

The processing system 100 includes a core 110. In one example, the processing system 100 includes two or more cores 110. The core 110 includes processor 111. In one example, the processor 111 is a central processing unit (CPU). In another example, the processor 111 is a 32-bit or a 64-bit reduced instruction set computer (RISC) processor. In other examples, other types of processors may be used. The processor 111 may be configured similar to the processor device 1202 of FIG. 12.

The core 110 further includes a floating point unit (FPU) circuitry 112. The FPU circuitry 112 performs one or more operations on floating point numbers. For example, the FPU circuitry 112 performs one or more of addition, subtraction, multiplication, division, and/or square root operations, among others.

Further, the core 110 includes instructions 113. The instructions 113 correspond to one or more applications to be performed by the processor 111. In one example, the instructions 113 include transaction control statements configured to be performed by the processor 111.

The core 110 includes a memory protection unit (MPU) circuitry 114. The MPU circuitry 114 performs memory protection functions. For example, the MPU circuitry 114 performs memory protection functions for a cache memory (e.g., the cache memory 118). The MPU circuitry 114 monitors transactions, including instruction fetches and data accesses from the processor 111. The MPU circuitry 114 detects access violations and triggers fault exceptions.

The core 110 includes a memory management unit (MMU) circuitry 115. The MMU circuitry 115 handles memory requests made by the processor 111. In one example, the MMU circuitry 115 performs translations of virtual memory addresses to physical addresses. Further, the MMU circuitry 115 controls transactions provided to a cache memory (e.g., the cache memory 118), bus arbitration and/or memory bank switching.

The core 110 includes closely coupled memory (CCM) 116. The CCM 116 is mapped into a physical memory space and has a base address that is configurable. The CCM 116 has a direct memory interface that provides burst read and write memory operations for the processor 111. In one example, the CCM 116 is a random access memory (RAM). Further, the CCM 116 may be an instruction CCM for code instruction references and/or a data CCM for data references.

The core includes 110 includes pipeline 117. The pipeline 117 receives and processes instructions in a pipelined fashion. The pipeline 117 includes one or more stages. In one or more examples, the stages of the pipeline include a series of sequential steps performed by different portions of the core.

In one example, the pipeline 117 includes fetch stages 120, execution stages 122, and data cache stages 124. The fetch stages 120 fetch (obtain) instructions (e.g., memory access instructions) from a memory (e.g., the cache memory 118). Further the fetch stages 120 decode the instructions, and fetch the source operands (e.g., read registers associated with the instructions while decoding the instruction). The execution stages 122 perform an operation specified by the decoded instructions. In one example, the execution stages 122 additionally or alternatively, calculate an address. Further, the execution stages 122 perform one or more store functions associated with the instructions. During the execution stages 122, information corresponding to results (e.g., store instructions) are stored within buffer circuitry 126 of the core 110.

The data cache stages 124 access a data cache memory (e.g., the cache memory 118). In one example, the data cache stages 124 access the data cache memory to perform one or more load functions associated with the instructions. In one example, the MMU circuitry 115 controls the loading of transactions into the data cache stages 124.

The core 110 further includes a cache memory 118. The cache memory 118 is one or more of an instruction cache memory and a data cache memory. The cache memory 118 may be a level one cache memory. In one example, the cache memory 118 is shared among multiple different cores.

The core 110 includes a cache coherency unit 119. The cache coherency unit 119 provides input/output coherency between the cache memory 118 and the processor 111. In one example, the cache coherency unit 119 includes an interconnect and controller to ensure consistency of shared data within the cache memory 118.

In one example, the processing system 100 further includes interconnect 130. The interconnect 130 is connected to the core 110 and the ports 132. The interconnect 130 includes one or more connections and/or one or more switches that connect the core 110 with the ports 132. The interconnect 130 may be a programmable interconnect or a non-programmable (e.g., hard-wired) interconnect. The ports 132 provide a communication pathway with devices external to the processing system 100.

Figure 2:
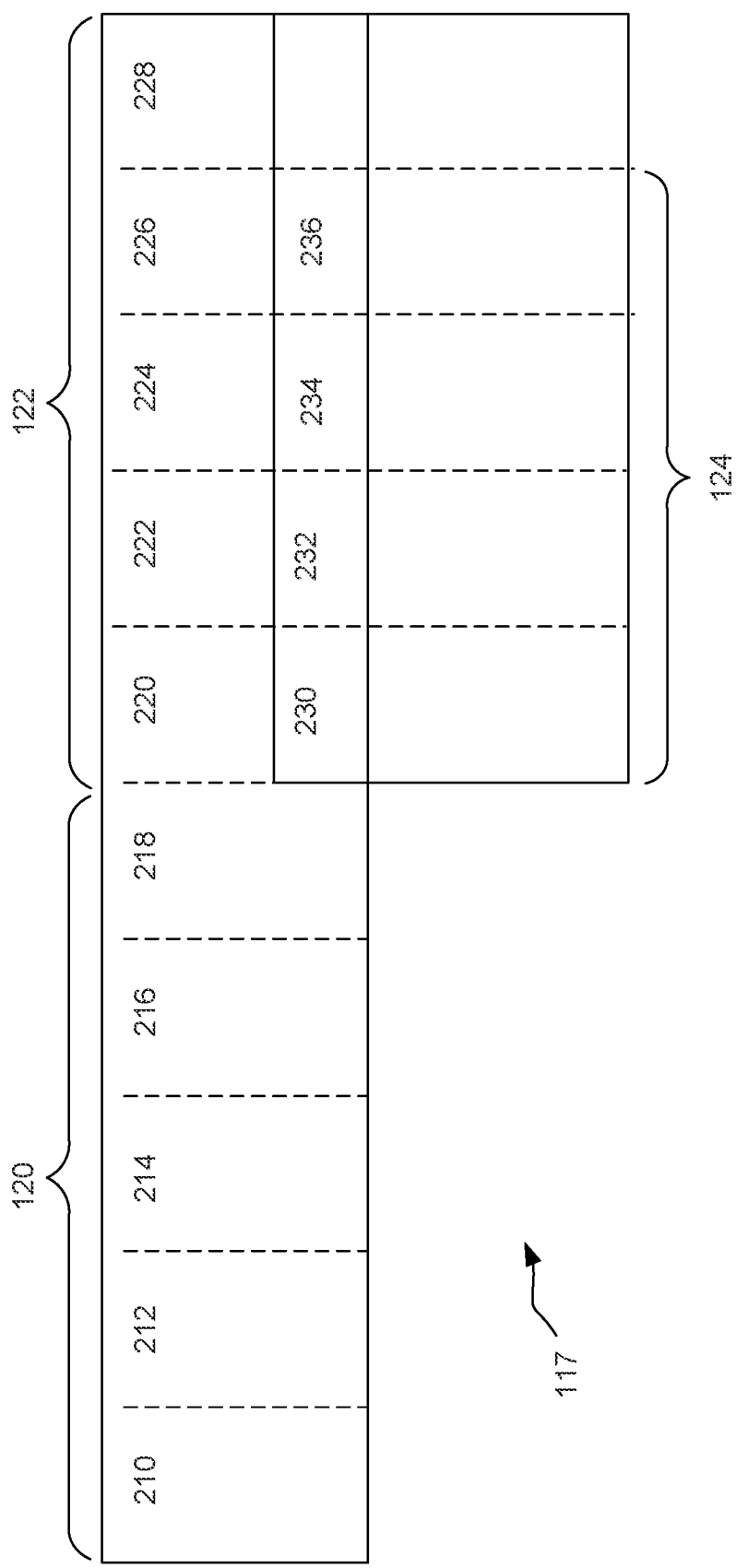
FIG. 2 illustrates a pipeline of an example processing system, according to one or more examples.

FIG. 2 illustrates an example of the pipeline 117. As illustrated in FIG. 2, the pipeline 117 is a ten stage pipeline. In other examples, the pipeline 117 may include more or less than ten stages. The fetch stages 120 includes stages 210-218. The stages 210-218 occur subsequent to each other. In one example, during the stage 210 (e.g., a first fetch stage) the CCM 116 is read by the processor 111 to obtain a memory access instruction (e.g., a store instruction or a load instruction). Further during the stage 210, branch prediction is performed. Branch prediction includes predicting the direction of a branch of a branching instruction before the direction is definitively known. Branch prediction is performed by branch prediction circuitry (not shown) of the core 110.

During stage 212 the packets of the memory access instruction are stored by the processor 111 within a fetch buffer (not shown) of the core 110. In one example, the fetch buffer is part of the processor 111. Further, at stage 212, hit detection is performed by the processor 111. For examples, during stage 212, a fetch request to the CCM 116 is made for the address of a branch of a branching instruction. If the target address is found in a first level of the CCM 116, a hit occurs (e.g., a hit is detected). If the target address is not found in a first level of the CCM 116, the subsequent levels of the CCM 116 are searched to find a hit.

The stage 214 is an alignment stage. During the alignment stage, a fixed number of aligned bytes are read from the CCM 116 and stored in a register by the processor 111. The aligned bytes are aligned on even address for half-word alignment or on addresses that are a multiple of four for full word alignment.

The stages 216 and 218 are decode stages. During the stage 216, instructions from the fetch buffer are decoded by the processor 111, and resources for the instructions are allocated by the processor 111. During the stage 218, the source operands associated with the instructions are located and stored in a register by the processor 111.

The execution stages 122 include stages 220-228. The stages 220-228 occur subsequent one another, and subsequent to the fetch stages 120. At the stage 220, an arithmetic logic unit (ALU) operation is performed on the operands stored within the register during stage 222. During the stage 220, the ALU of the processor 111 obtains the operands from the register and performs an operation associated with the operands.

At stage 222, mispredicted branches are detected. For example, at stage 222, the processor 111 determines whether or not the branch prediction performed at stage 210 was correct or not correct (e.g., mispredicted). If a misprediction is detected, the pipeline 117 is flushed, and/or the processor 111 is directed to the correct target by the branch prediction circuitry.

At stage 224 operand bypassing (or forwarding) is performed. For example, operand bypass circuitry within the processor 111 minimizes data dependency stalls within the pipeline by storing an intermediate value or values received from the stage 222 and providing the intermediate value to the ALU operation of the stage 226. In one example, two instructions may interfere with each other due to a flow (data) dependence between the instructions, an anti-dependence between the instructions, and/or an output dependence between the instructions. Using the operand bypass circuitry mitigates interference between the instructions by allowing a dependent instruction access to a new value produced by another instruction directly.

At the stage 226, an ALU operation is performed on the operands stored within the operand bypass circuitry. The stage 226 may be referred to as a commit stage. During the stage 226, ALU circuitry of the processor 111 obtains the operands from the operand bypass circuitry and performs an operation associated with the operands. The output (e.g., results) of the ALU circuitry may be referred to as store instructions. The store instructions are stored in the buffer circuitry 126 by the processor 111 as committed stores. In one example, the store instructions are stored within a store buffer of the buffer circuitry 126. Further, during stage 226 exceptions and/or interrupts are handled by the processor 111. The exceptions and/or interrupts may be caused by a misaligned memory action, protection violation, page fault, undefined operand code, arithmetic overflow, and misaligned memory access protection, among others. In one example, the output of the ALU operation (e.g., the result) is flushed (or dumped) if an exception (e.g., a page fault) is detected.

The stage 228 is a writeback stage. During the stage 228, the processor 111 writes the output (e.g., the store instructions) of the ALU operation at stage 226 to the memory 118. The data cache stages 124 include the stages 230-236. The stages 230-236 occur subsequent to each other and subsequent to the stage 218. Further, the stages 230-236 occur in parallel (e.g., during an at least partially overlapping time) with the stages 220-226. In one example, the stage 220 is performed in parallel with the stage 230, the stage 222 is performed in parallel with the stage 232, the stage 224 is performed in parallel with the stage 234, and the stage 226 is performed in parallel with the stage 236.

At stage 230, the source operands associated with the instructions are obtained from the register. For example, the processor 111 obtains the source operands from the register. At the stages 232 and 234, the cache memory 118 is accessed to determine if the target address of the memory access instruction is available. At stage 236, if the target address is determined to be available by the processor 111, an address hit is detected at a first level of the cache memory 118. If not, subsequent levels of the cache memory 118 are searched until a hit on the target address is determined. In one example at the stage 228, the load buffer of the memory 118 is written based on the data of the memory access instruction.

The store instructions are stored in the buffer circuitry 126. The store instructions may be committed stores stored at stage 226 of the pipeline 117. In other examples, the store instructions are stored in the buffer circuitry 126 before the committed stores are generated. For example, the store instructions may be stored during other stages of the pipeline 117.

Figure 3:
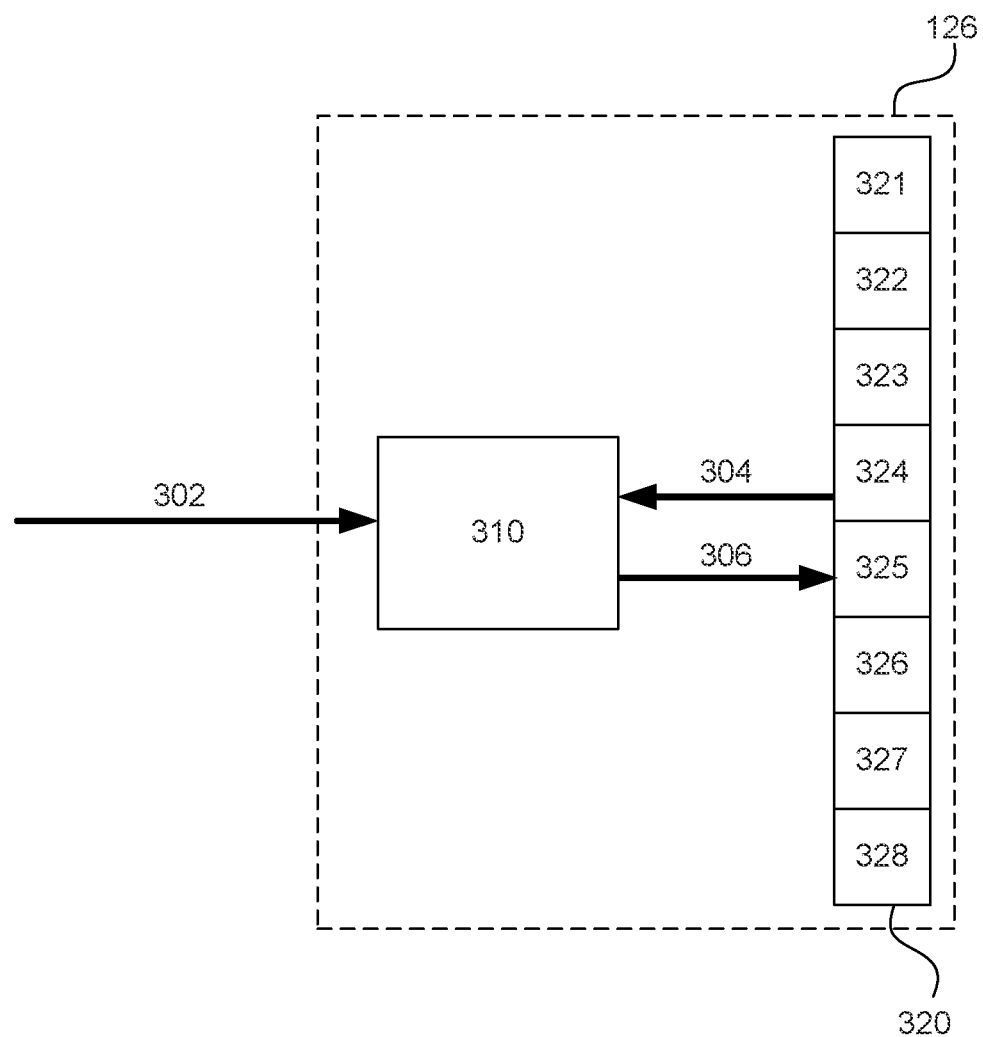
FIG. 3 illustrates an example block diagram of buffer circuitry, according to one or more examples.

FIG. 3 illustrates an example schematic block diagram of the buffer circuitry 126. The buffer circuitry 126 includes comparator circuitry 310 and a store buffer 320. The comparator circuitry 310 receives a store instruction 302. For example, the comparator circuitry 310 may receive the store instruction 302 from the ALU logic of stage 226 as a committed store. Further, the comparator circuitry 310 receives address information from the entries within the store buffer 320, and communicates address information to the store buffer 320.

Figure 8:
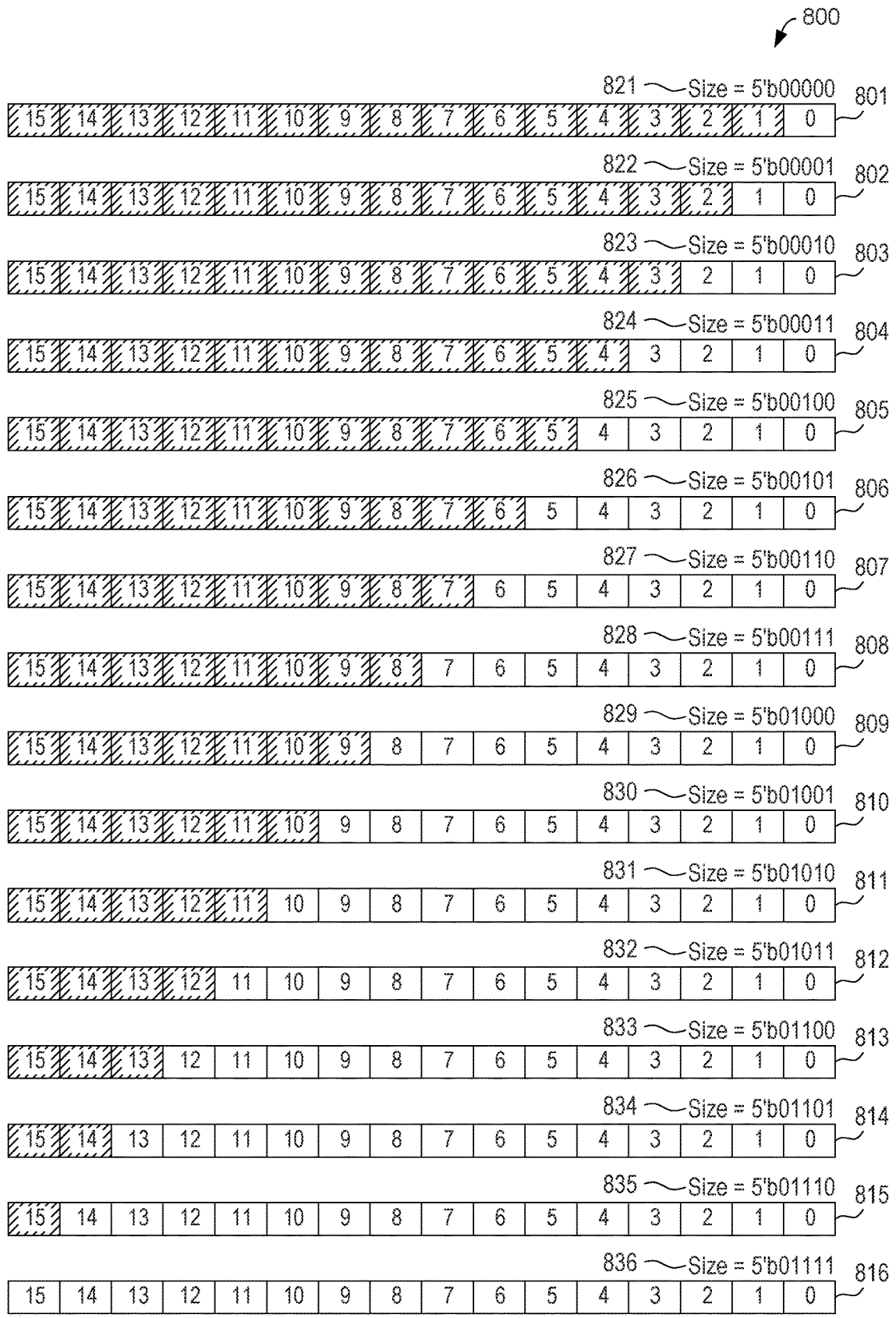
FIG. 8 illustrates example patterns of a write mask, according to one or more examples.

The store buffer 320 includes buffer locations 321-328. Each of the buffer locations 321-328 stores data of a store instruction as entries. For example, each of the buffer locations 321-328 stores N bits of data, a target address, and size field (e.g., size parameter). N is one or more. In one or more examples, N is $2^M$, where M is one or more. In another example, each of the buffer locations 321-328 stores more than or less than 128 bits of data. The size field indicates the size of the data stored within the buffer locations 321-328. In one example, the size parameter indicates a pattern associated with the target address or addresses of the data stored in the buffer locations 321-328. The size field may have five bits. The four least significant bits (LSBs) are used to indicate the pattern. While four LSBs are used to indicate the pattern, in other examples, more than or less than four LSBs may be used to indicate the pattern. The most significant bit (MSB) (or bits (MSBs)) is used to indicate whether or not address gaps exist in the pattern. FIG. 8 illustrates the size fields 821-836 of different stages 801-816 of the write mask 800. As illustrated in FIG. 8, the LSB of the size fields 821-836 indicate the pattern of the addresses of merged store instructions. The MSB of the size fields 821-836 indicate whether or not an address gap exists within the pattern. As no address gaps are illustrated in FIG. 8, the MSB of each of the size fields 821-836 is set to a value of 0. In the size fields 921-936 of the stages 901-916 of the write mask 900, the MSB is set to a value of 1, indicating that address gaps exist within the patterns of the stages 901-916 of the write mask 900. In one or more examples, the store buffer 320 stores the size field and does store the write mask.

The comparator circuitry 310 receives the store instruction 302 and the address of the newest (youngest) entry stored within the buffer locations 321-328. The entries within the buffer locations 321-328 are sorted based on the relative age of the entries. In one example, the entries are sorted such that an oldest entry is stored in the buffer location 321, and the relative age of the entries decreases from the buffer location 321 to the buffer location 328. In another example, the entries are sorted such that an oldest entry is stored in the buffer location 328, and the relative age of the entries decreases from the buffer location 328 to the buffer location 321.

The comparator circuitry 310 determines (identifies) the youngest entry within the buffer locations 321-328 and obtains the target address and size parameter associated with entry. The comparator circuitry 310 compares the target address of the store instruction 302 to that of the youngest entry (e.g., address 304) to determine whether or not to merge the addresses. If merged, the address of the merged instruction 306 is stored to the youngest entry within the buffer locations 321-328. Further, the size parameter of the youngest entry within the buffer locations 321-328 is updated based on the merged instruction 306.

In one or more examples, the write mask is 16 bits. In other examples, the write mask may be larger or smaller than 16 bits. The bits of the write mask indicate which bits that will be modified by a write command. FIG. 8 illustrates an example of the different stages of a write mask 800 and is described in greater detail in the following.

In one example, each store instruction is communicated to a memory (e.g., a memory external to the processing system 100 of FIG. 1) as a transaction via a communication bus. The core 110 communicates with the communication bus via the interconnect 130 and the ports 132. Each store instruction may be communicated via a separate transaction, such that the number of transactions is equal to the number of store instructions. However, in various examples, to reduce the number of transactions, two or more of the store instructions are merged with each other. For example, FIG. 4 illustrates transactions 401-408 that are each independently written to a memory (e.g., via eight transactions). The transactions 401-408 correspond to half-word store instructions. Each of the transactions 401-408 is associated with an address. As can be seen from FIG. 4, the addresses of the transactions 401-408 are contiguous. Merging the store instructions 401-408 allows for the store instructions to be written in less than eight transactions. In one example, the store instructions associated with the transactions 401-408 are merged into a single store instruction, such that a single transaction is used to communicate the merged store instruction. Communicating a merged store instruction uses less processor resources, as compared to communicating multiple transactions. Further, using a single transaction to communicate multiple store instructions merged into a single merged store instruction frees up space within the communication bus for other communication processes to be completed.

Figure 5:
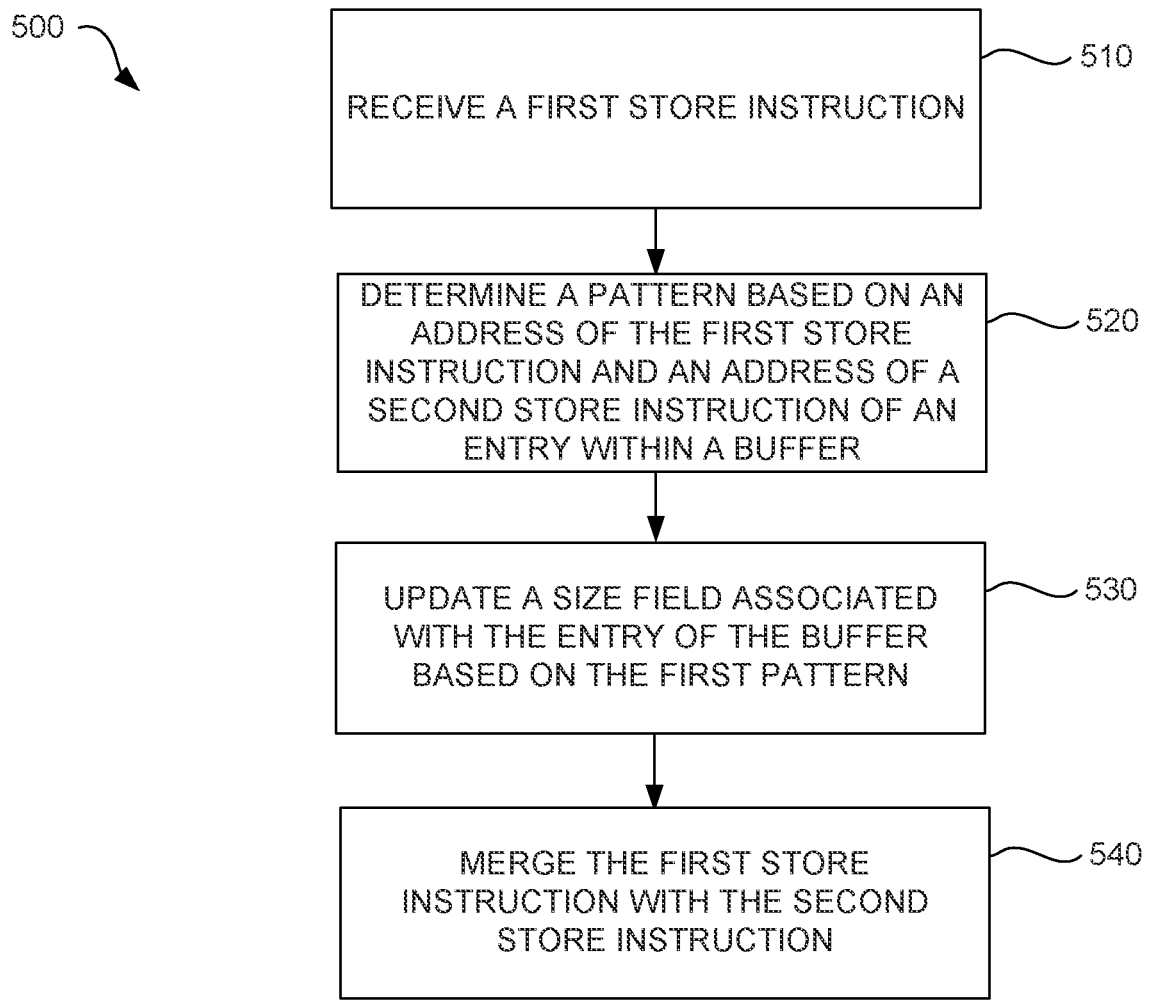
FIG. 5 is a flowchart of a method for merging store instructions, according to one or more examples.

FIG. 5 illustrates a flowchart of a method 500 for merging store instructions, according to one or more examples. The method 500 is performed by the processing system 100 of FIG. 1. In one example, the method 500 is performed by the buffer circuitry 126 of FIG. 1. The method 500 may be performed as part of stage 226 of the pipeline 117 of FIG. 2.

At 510 of the method 500, a first store instruction is received. For example, the first store instruction is received from the ALU logic of stage 226. The first store instruction is a committed store. Further, the first store instruction includes a target address, a mask, and a data structure (e.g., data) to be written to the target address. In one example, the first store instruction (e.g., the store instruction 302) is received by the comparator circuitry 310 as illustrated in FIG. 3.

At 520 of the method 500, a pattern is determined based on an address of the first store instruction and an address of a second store instruction. In one example, with reference to FIG. 3, the comparator circuitry 310 compares the address of the first store instruction with the address of a store instruction within an entry of the store buffer 320. For example, the store instruction 302 is received by the comparator circuitry 310. Further, the comparator circuitry 310 determines the youngest entry within the buffer locations 321-328, and obtains (receives), the address 304 of the youngest entry. In one example, the comparator circuitry 310 determines that the youngest entry is stored within the buffer location 328 based on the entries stored within the store buffer 320 being sorted such that the oldest entry is stored within the buffer location 321. The comparator circuitry 310 obtains the address 304 of the entry within the buffer location 328. The comparator circuitry 310 further receives a size field of the youngest entry, and compares the size field of the entry within the buffer location 328 with that of the store instruction 302 to determine whether or not the buffer location 328 has space to merge the store instruction 302 with the entry already within the buffer location 328.

The comparator circuitry 310 compares the address 304 of the entry within the buffer location 328 with the address of the store instruction 302 to determine whether or not the addresses are incremental with each other. The comparator circuitry 310 compares the address of the entry within the buffer location 328 with that of the store instruction 302 based on determining that there is space to merge the store instruction 302. Incremental addresses are addresses that are subsequent to each other in location. For example, the address 7469b200 is contiguous with the address 7469b201. In one example, incremental addresses are contiguous addresses. The determination as to whether or not two addresses are incremental is further based on the size of the store instructions. For example, if the size of store instruction 302 is one byte, the address 7469b200 is incremental with the address 7469b201 as the address are separated by one byte. In an example where the size of the store instruction 302 is a half-word (e.g., two bytes), the address of the store instruction 302 is 7469b202, which is determined to be incremental with the 7469b200, as the address 7469b202 is separated from the 7469b200 by the size the store instruction 302 (e.g., two bytes). In one or more examples, incremental addresses are addresses that are separated by the size of the newly received store instruction (e.g., store instruction 302).

Figure 6:
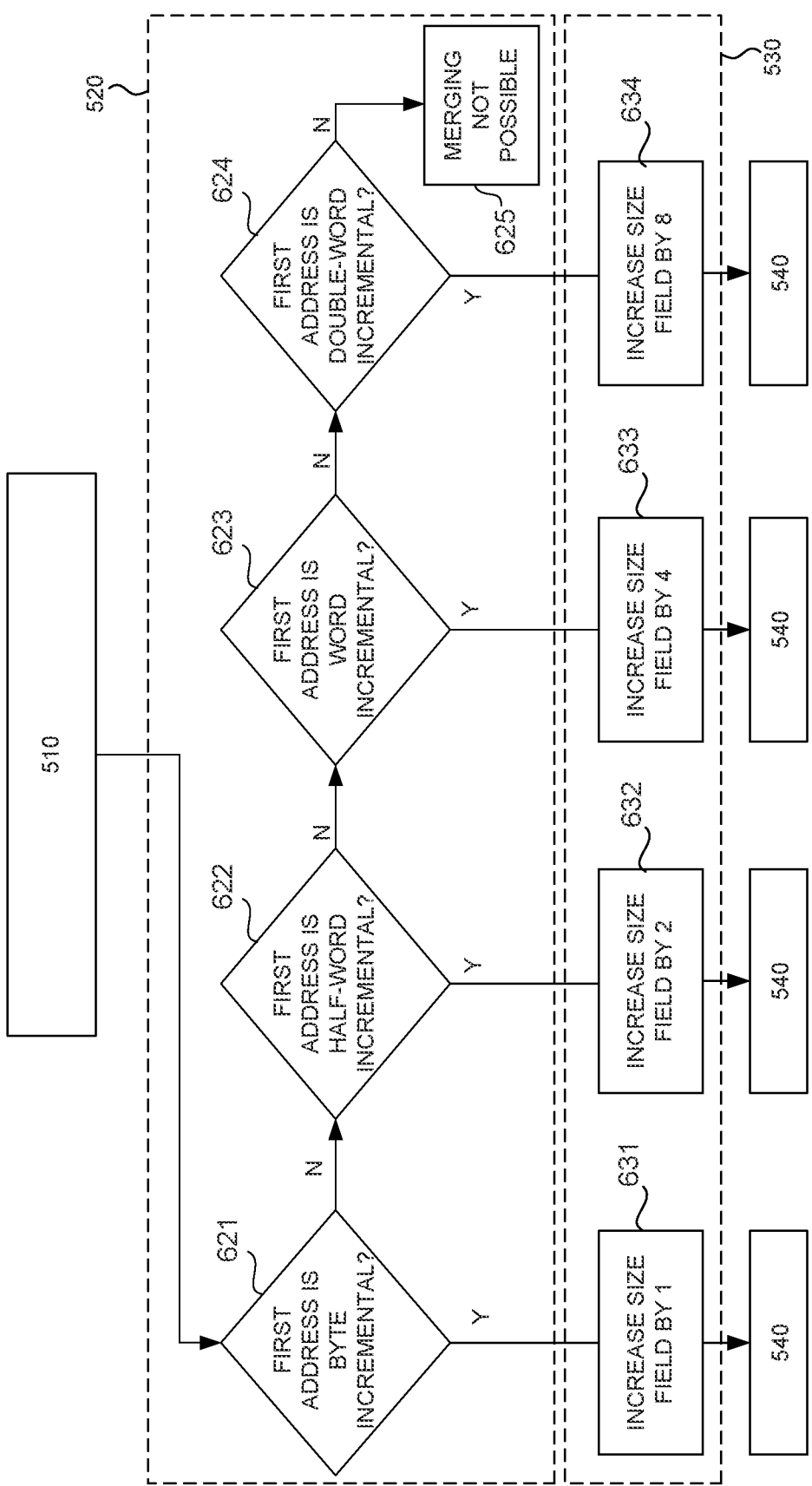
FIG. 6 is a flowchart of a method for determining a pattern for merging store instructions, according to one or more examples.

In one example, as illustrated by FIG. 6, 520 of the method 500 includes 621-625. For example, at 621 of 520, a determination as to whether or not the first address is byte incremental is made. For example, the first address (e.g., the address of the store instruction 302) is compared to the second address (e.g., the address 304 of the entry in the buffer location 328) to determine whether or not the first address is byte incremental with the second address. An address that is byte incremental is an address that is separated from another address by a byte. For example, the addresses 7469b200 and 7469b201 are byte incremental.

FIG. 8 illustrates the stages 801-816 of a write mask 800. The pattern of the write mask 800 is stored within the corresponding size fields 821-836. The size fields are stored within the buffer locations of a store buffer (e.g., the store buffer 320). Each stage 801-816 indicates a stage of the write mask 900 with a different number of merged store instructions and/or a different size of merged store instructions. In one or more examples, each of the stages 901-916 may be referred as a different write mask. The write mask 800 includes 16 bits, e.g., bits 0-15. In other examples, the write mask 800 may be larger or smaller than 16 bits. The stage 801 of the write mask 800 illustrates an example where a store instruction having a size of a byte is associated with bit 0 of the write mask 800. The stage 802 of the write mask 800 illustrates an example where both bits 0 and 1 of the write mask 800 are associated with a respective store commands. For single byte store commands, the bits 0 and 1 each correspond to a different store instruction.

If at 621, the first address is not determined to be byte incremental, a determination as to whether or not the first address is half-word incremental is made at 622. For example, the first address (e.g., the address of the store instruction 302) is compared to the second address (e.g., the address 304 of the entry in the buffer location 328) to determine whether or not the first address is half-word incremental. An address that is half-word incremental is an address that is separated from another address by two bytes. For example, the addresses 7469b200 and 7469b202 are half-word incremental.

With reference to FIG. 8, if the entry within the buffer location 328 has the size of a byte, the stage 803 indicates a store instruction that is separated from the entry associated with the address 304 within the buffer location 328 by a half-word (e.g., half-word incremental). If the entry within the buffer location 328 has the size of a half-word, the stage 804 indicates a store instruction that is separated from the entry associated with the address 304 within the buffer location 328 by a half-word (e.g., is half-word incremental).

If at 622, the first address is not determined to be half-word incremental, a determination as to whether or not the first address is word incremental is made at 623. For example, the first address (e.g., the address of the store instruction 302) is compared to the second address (e.g., the address 304 of the entry in the buffer location 328) to determine whether or not the first address is word incremental. An address that is word incremental is an address that is separated from another address by four bytes. For example, the addresses 7469b200 and 7469b204 are word incremental.

With reference to FIG. 8, if the entry within the buffer location 328 has the size of a byte, the stage 806 indicates a store instruction that is separated from the entry within the buffer location 328 by a word (e.g., is word incremental). If the entry within the buffer location 328 has the size of a half-word (e.g., stage 802), the stage 806 indicates a store instruction that is separated from the entry within the buffer location 328 by a word (e.g., is word incremental).

If at 623, the first address is not determined to be word incremental, a determination as to whether or not the first address is double-word incremental is made at 624. For example, the first address (e.g., the address of the store instruction 302) is compared to the second address (e.g., the address 304 of the entry in the buffer location 328) to determine whether or not the first address is word incremental. An address that is double-word incremental is an address that is separated from another address by eight bytes. For example, the addresses 7469b200 and 7469b208 are double-word incremental.

With reference to FIG. 8, if the entry within the buffer location 328 has the size of a byte, the stage 809 indicates a store instruction that is separated from the entry within the buffer location 328 by a double-word (e.g., is double-word incremental). If the entry within the buffer location 328 has the size of a half-word (e.g., stage 802), the stage 810 indicates a store instruction that is separated from the entry within the buffer location 328 by a double-word (e.g., is word incremental).

If at 624, the first address is determined to not be double-word incremental, a determination that merging is not possible is made at 625. In one example, the method 500 ends based on determining that the merging is not possible at 625.

While 621-624 are illustrated as being completed sequentially, in other examples, two or more of 621-664 may occur during at least a partially overlapping period. In such an example, 621, 622, 623, and 624 each receive the first address and analyze the first address as described above. If, the outcome of each of 621-624 is "No", then merging is not determined at 625. In other examples, 621-624 may be performed in another order than that shown in FIG. 6.

In one example, incremental addresses may be separated by one or more bytes. For example, the store instruction 302 has a size of one byte, and has an address of 7469b202. Further, in such an example, the address 304 of the entry within buffer location 328 is 7469b200. While the addresses 7469b200 and 7469b202 are separated by more than the size of the store instruction 302 (e.g., more than one byte), the addresses 7469b200 and 7469b202 are determined to be incremental to each other as the address are subsequent to each other.

In one example, determining the pattern includes determining whether or not an address of a store instruction (e.g., the store instruction 302) is incremental with an address of an entry in the store buffer (e.g., the entry within the buffer location 328) and the number of bytes that separate the addresses (e.g., size of the address gap).

Figure 7:
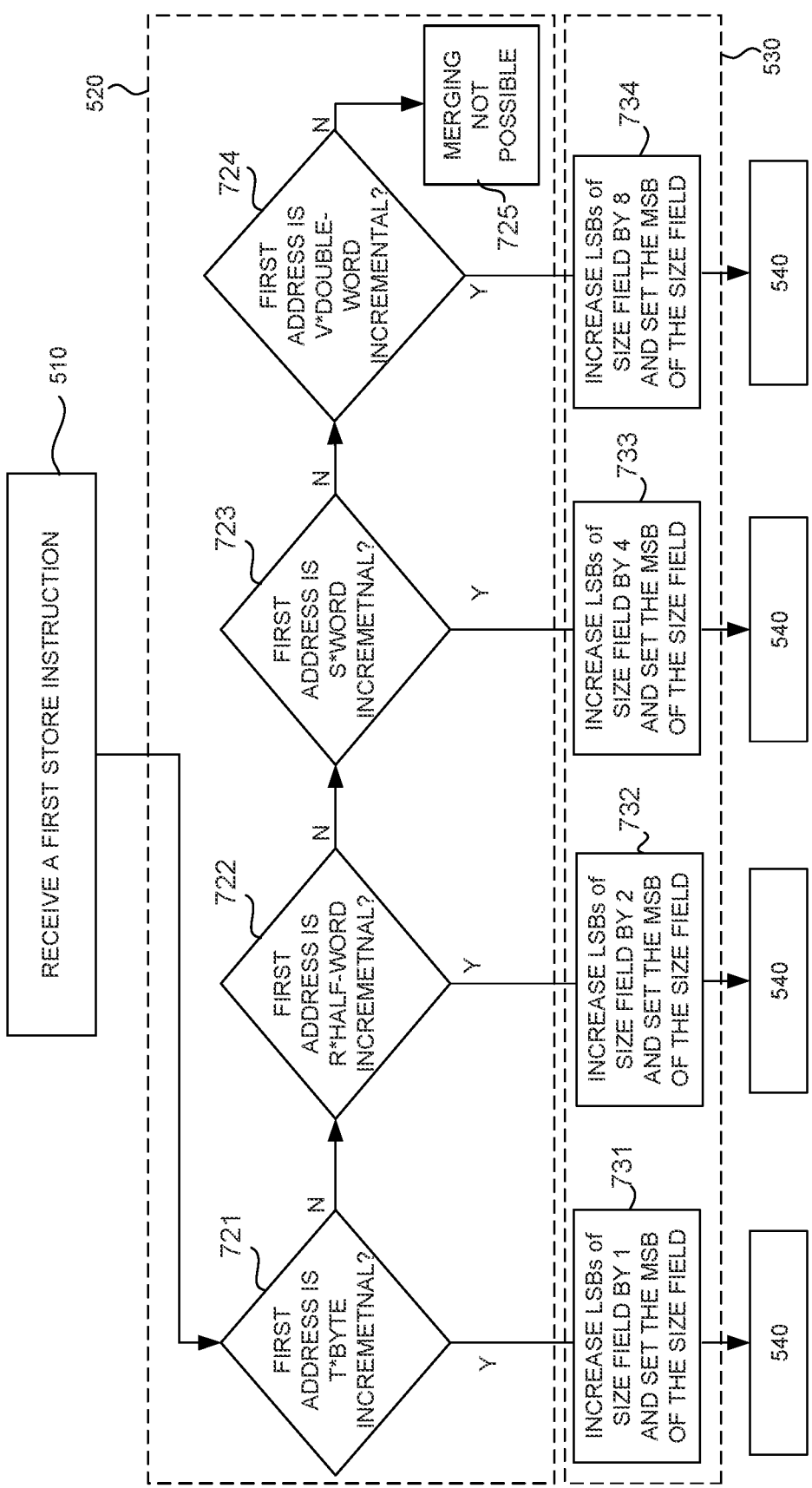
FIG. 7 is a flowchart of a method for determining a pattern for merging store instructions, according to one or more examples.

In one examples, as illustrated by FIG. 7, 520 of the method 500 includes 721-725. For example, at 721 of 520, a determination as to whether or not the first address is T*bytes incremental is made. T is one or more. In one example, T is two or more. For example, the first address (e.g., the address of the store instruction 302) is compared to the second address (e.g., the address 304 of the entry in the buffer location 328) to determine whether or not the first address is T*bytes incremental. An address that is T*bytes incremental is an address that is separated from another address by one or more bytes (e.g., an address gap of one or more bytes). For example, the addresses 7469b200 and 7469b202 are T*byte incremental, with an address gap at 7469b201.

Figure 9:
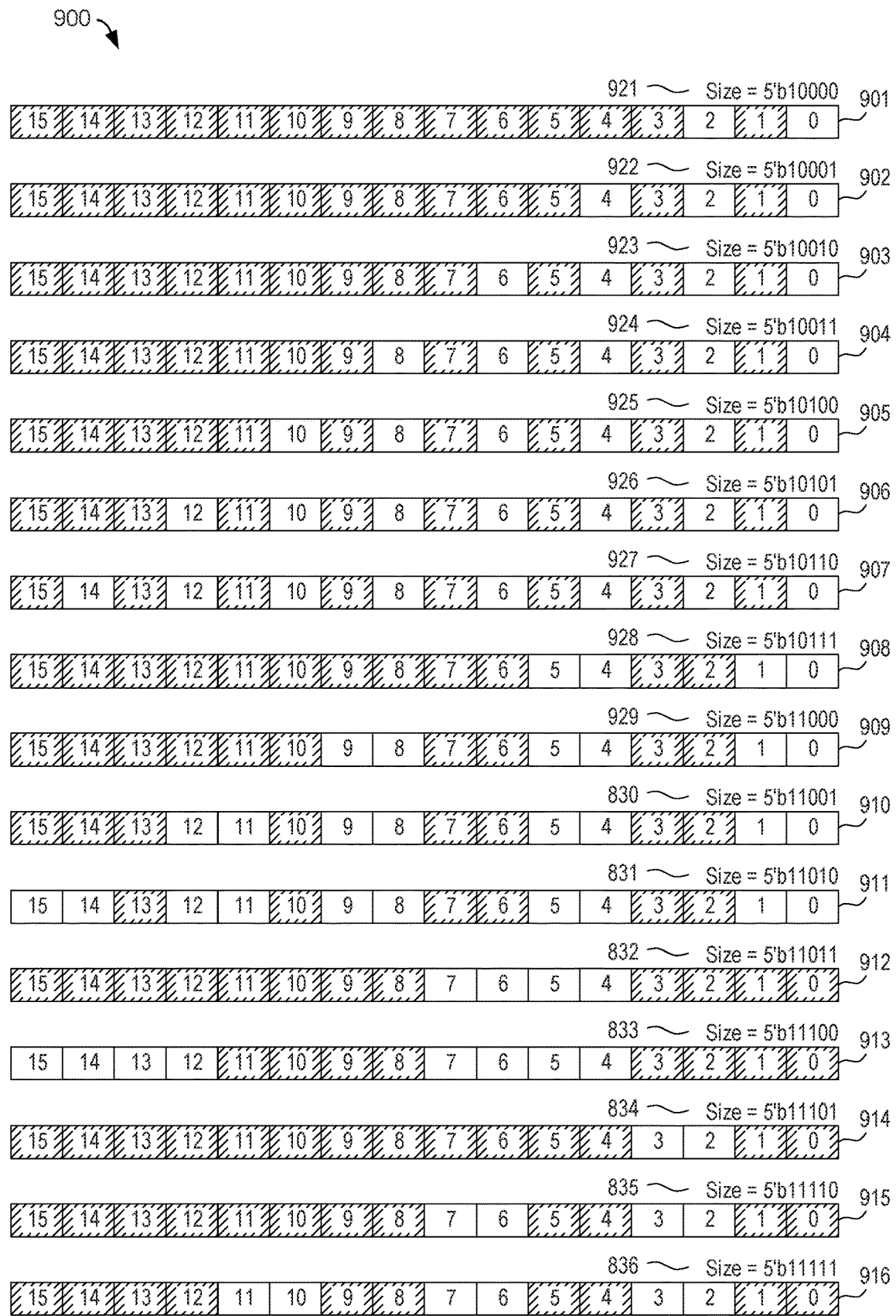
FIG. 9 illustrates example patterns of a write mask, according to one or more examples.

FIG. 9 illustrates the stages 901-916 of a write mask 900. Each stage 901-916 indicates a stage of the write mask 900 with a different number of merged store instructions and/or a different size of merged store instructions. Each stage 901-916 is associated with a corresponding size field 921-936, which stores the pattern of the corresponding stage 901-916. In one or more examples, each of the stages 901-916 may be referred as a different write mask. The write mask 900 includes 16 bits, e.g., bits 0-15. Stage 901 of the write mask 900 indicates an example where a first store instruction having a size of a byte is associated with bit 0 of the write mask 900, a second store instruction having a size of a byte is associated with bit 2 of the write mask 900, and bit 1 is associated with an address gap. While 16 different write masks (e.g., stages) are shown in FIG. 9, illustrating 16 different patterns, in other examples, additional write masks and patterns are possible. For example, as illustrated by stage 916, the corresponding write mask includes half-word store instructions associated with bits 2 and 3, 6 and 7, and 10 and 11. Further, address gaps are associated with bits 0 and 1, 4 and 5, and 8 and 9. In another stage, the write mask may include an additional half-word instruction at bits 14 and 15, with an address gap a 12 and 13.

If at 721, the first address is not determined to be T*byte incremental, a determination as to whether or not the first address is R*half-word incremental is made at 722. R is one or more. In other examples, R is two or more. For example, the first address (e.g., the address of the store instruction 302) is compared to the second address (e.g., the address of the entry in the buffer location 328) to determine whether or not the first address is R*half-word incremental. An address that is R*half-word incremental is an address that is separated from another address by one or more half-words. In one or more examples, a first address is separated from another address by one or more half-words (e.g., an address gap of one or more half words). The first store instruction has a size of a byte, half-word, word, or double word, and the second store instruction has a size of a byte, half-word, word, or double word. For example, the addresses 7469b200-7469b201 and 7469b204-7469b205 are R*half-word incremental as the two half-word store instructions are separated by addresses 7469b202-7469b203.

With reference to FIG. 9, if the entry within the buffer location 328 has the size of a half-word, the stage 909 indicates a store instruction that is separated from the store instructions of stage 908 by R*half-word (e.g., is half-word incremental). A half-word address gap is between the store instructions of stage 909.

If at 722, the first address is not determined to be R*half-word incremental, a determination as to whether or not the first address is S*word incremental is made at 723. S is one or more. In other examples, S is two or more. For example, the first address (e.g., the address of the store instruction 302) is compared to the second address (e.g., the address 304 of the entry in the buffer location 328) to determine whether or not the first address is S*word incremental. An address that is S*-word incremental is an address that is separated from another address by one or more words. In one or more examples, a first address is separated from another address by one or more words. The first store instruction has a size of a byte, half-word, word, or double word, and the second store instruction has a size of a byte, half-word, word, or double word. In one example, the addresses 7469b200-7469b203 and 7469b208-7469b20b are S*word incremental as the word store instructions are separated by addresses 7469b204-7469b207 (e.g., an address gap having the size of a word).

With reference to FIG. 9, if the entry within the buffer location 328 has the size of a word, the stage 911 indicates a store instructions separated that are word incremental with each other. For example, an address gap of a word size is between the store instructions of the stage 911.

If at 723, the first address is not determined to be S*word incremental, a determination as to whether or not the first address is V*double-word incremental is made at 724. V is one or more. In other examples, V is two or more. For example, the first address (e.g., the address of the store instruction 302) is compared to the second address (e.g., the address of the entry in the buffer location 328) to determine whether or not the first address is V*double-word incremental. An address that is V*double-word incremental is an address that is separated from another address by one or more double-words. In one or more examples, a first address is separated from another address by one or more double-words. The first store instruction has a size of a byte, half-word, word, or double word, and the second store instruction has a size of a byte, half-word, word, or double word. In one or more examples, the addresses 7469b200 and 7469b209-7469b210 are V*double-word incremental as the two word store instructions are separated by addresses 7469b201-7469b208 (e.g., a double-word).

If at 724, the first address is determined to not be S*double-word incremental, a determination that merging is not possible is made at 725. In one example, the method 500 ends based on determining that the merging is not possible at 725.

While 721-724 are illustrated as being completed sequentially, in other examples, two or more of 721-724 may occur during an at least partially overlapping period. In such an example, 721, 722, 723, and 724 each receive the first address and analyze the first address as described above. If, the outcome of 721-724 is all "No", then merging is not determined at 725. In other examples, 721-724 may be performed in another order than that shown in FIG. 7.

At 530 of the method 500, the size field associated with the entry within the buffer is updated based on the pattern determined at 520 of the method 500. For example, the size field indicates the number of bytes in each store instruction. In one example, the size field indicates whether or not address gaps, or spaces, are present between the addresses of the store instructions. In one example, the size field includes five bits. In other examples, the size field includes more than five bits. The least significant bits of the size field are used to encode the pattern. The most significant bit (or bits) is used to encode whether or not address gaps exist. The buffer circuitry 126 updates the size field based on the pattern determined between the store instruction 302 and the entry in the buffer location 328.

In one example, 530 of the method 500 includes one or more of 631, 632, 633, and 634 of FIG. 6. With reference to FIG. 6, at 631, based on a determination that the first address is byte incremental at 621, the size field is increased by 1. For example, as is illustrated by FIG. 8, at stage 802 the size field 822 is increased from the size field 821 by 1 (e.g., from 5'b00000 to 5'b00001). At 632, based on a determination that the first address is half-word incremental at 622, the size field is increased by 2. For example, as is illustrated by FIG. 8, at stage 803 the size field 823 is increased from the size field 821 by 2 (e.g., from 5'b00000 to 5'b00010). At 633, based on a determination that the first address is word incremental at 623, the size field is increased by 4. For example, as is illustrated by FIG. 8, at stage 805 the size field 825 is increased from the size field 821 by 4 (e.g., from 5'b00000 to 5'b00100). At 634, based on a determination that the first address is double-word incremental at 624, the size field is increased by 8. For example, as is illustrated by FIG. 8, at stage 809 the size field 829 is increased from the size field 821 by 8 (e.g., from 5'b00000 to 5'b01000).

In one example, 530 of the method 500 includes one or more of 731, 732, 733, and 734 of FIG. 7. With reference to FIG. 7, at 731, based on a determination that the first address is T*byte incremental at 721, the LSBs of the size field are increased by 1, and the MSB of the size field is set (e.g., the size field is increased by 16). For example, as is illustrated by FIG. 9, at stage 902 the LSBs of the size field 922 are increased from the size field 921 by 1, and the MSB in size field 922 is set such that the size fields go from 5'b10000 to 5'b10001, to account for an address gap between the store instructions. As can be seen from FIG. 9, the MSB of size fields 901-936 are set to "1", indicating that there is an address gap in the corresponding pattern. In other examples, the size fields 901-936 include MSBs that are used to store whether or not address gaps exist and the size of the address gaps within the corresponding pattern. The number of MSBs is two or more. At 732, based on a determination that the first address is R*half-word incremental at 722, the LSBs of the size field are increased by 2, and the MSB of the size field is set (e.g., the size field is increased by 16). For example, as is illustrated by FIG. 9, at stage 909 the size field 929 is increased from the size field 928 of stage 908 to go from 5'b10111 to 5'b11000. At 733, based on a determination that the first address is S*word incremental at 723, the LSBs of the size field are increased by 4 and the MSB of the size field is set (e.g., the size field is increased by 16). For example, as is illustrated by FIG. 9, at stage 913 the size field 933 is increased from the size field 932 to go from 5'b11011 to 5'b11100. At 734, based on a determination that the first address is V*double-word incremental at 724, the LSBs of the size field are increased by 8, and the MSB of the size field is set (e.g., the size field is increased by 16).

In one or more examples, the number of bits within the size field is greater than five. For example, the size filed may have a size of six bits. In such an example, two bits within the size field may be used to indicate patterns additional to those illustrated in FIG. 9. For example, the two bits may be used to indicate a pattern that includes address gaps of varying sizes within a write mask.

At 540 of the method 500, the first store instruction is merged with the second store instruction. For example, the buffer circuitry 126 merges the store instruction 302 with the address 304 of the entry within the buffer location 328 to generate a merged store instruction 306. The merged store instruction 306 is stored within the buffer location 328. Further, the merged store instruction 306 may be communicated along a communication bus via an interconnect (e.g., the interconnect 130 of FIG. 1), and a port or ports (e.g., the ports 132) to a memory as a common transaction by the processor 111. For example, at stage 228 of the pipeline 117 of FIG. 2, the processor 111 communicates the merged store instruction as a common transaction to an external memory via the communication bus.

Figure 10:
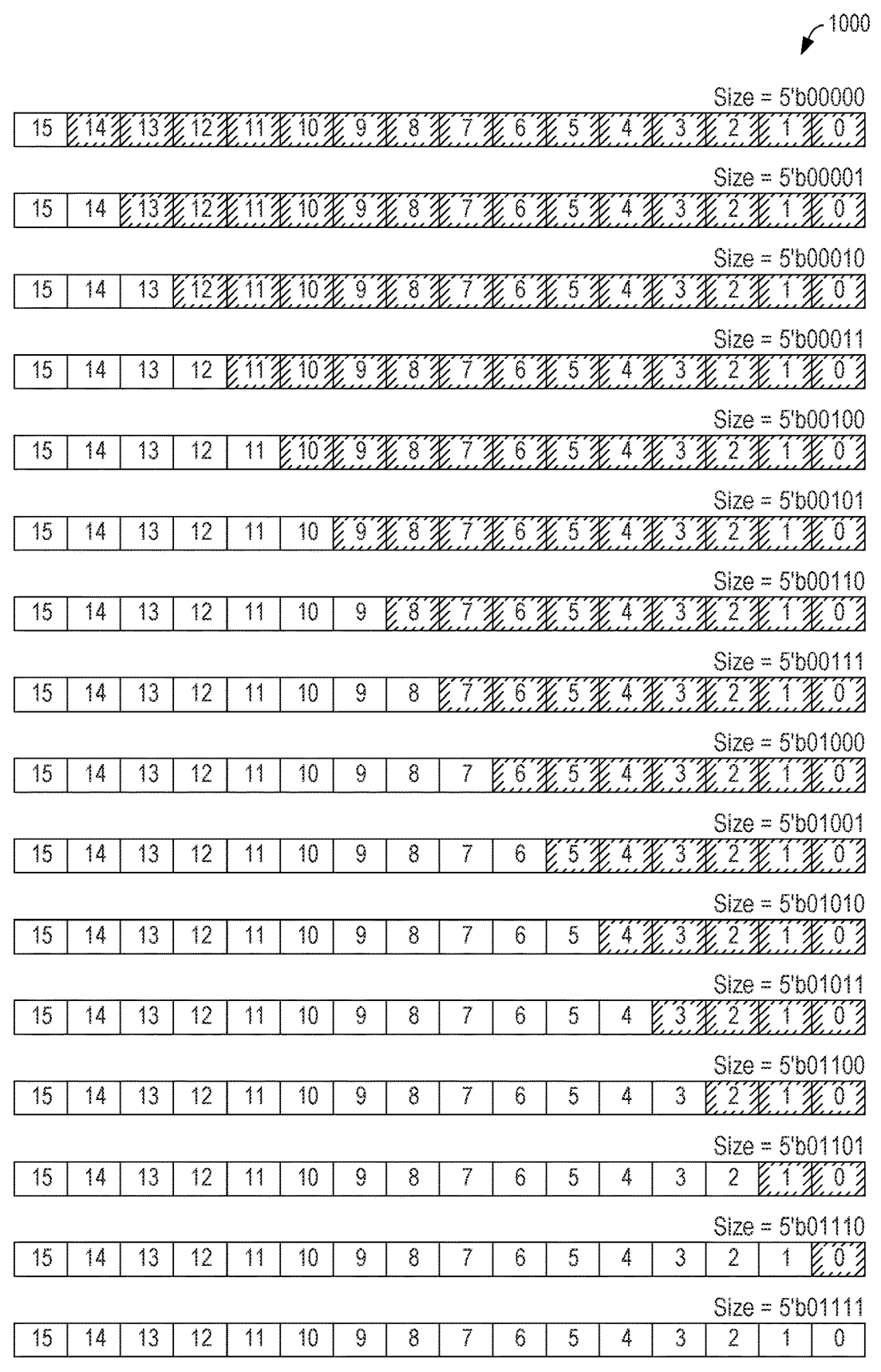

FIG. 10 illustrates stages of a write mask 1000, according to one or more examples. The stages of the write mask 1000 is similar to that of the write mask 800 of FIG. 8, however, the direction that the bits are stored within the write mask 1000 is in an opposite direction to that of the write mask 800. Each stage indicates a stage of the write mask 1000 with a different number of merged store instructions and/or a different size of merged store instructions. In one or more examples, each of the stages may be referred as a different write mask. In one example, a value of a bit (e.g., bit of a direction field) within each buffer location (e.g., the buffer locations 321-328) of a buffer (e.g., the store buffer 320) is used to determine the direction that that the bits within the write mask are stored. For example, a value of 0 for the direction bit indicates a direction as illustrated in FIG. 8, and a value of 1 for the bit of a direction field indicates a direction as illustrated in FIG. 10. In one or more examples, the bit of the direction field is updated based on a determination as to the direction that the bits within the write mask 800 or 1000 are updated.

Figure 11:
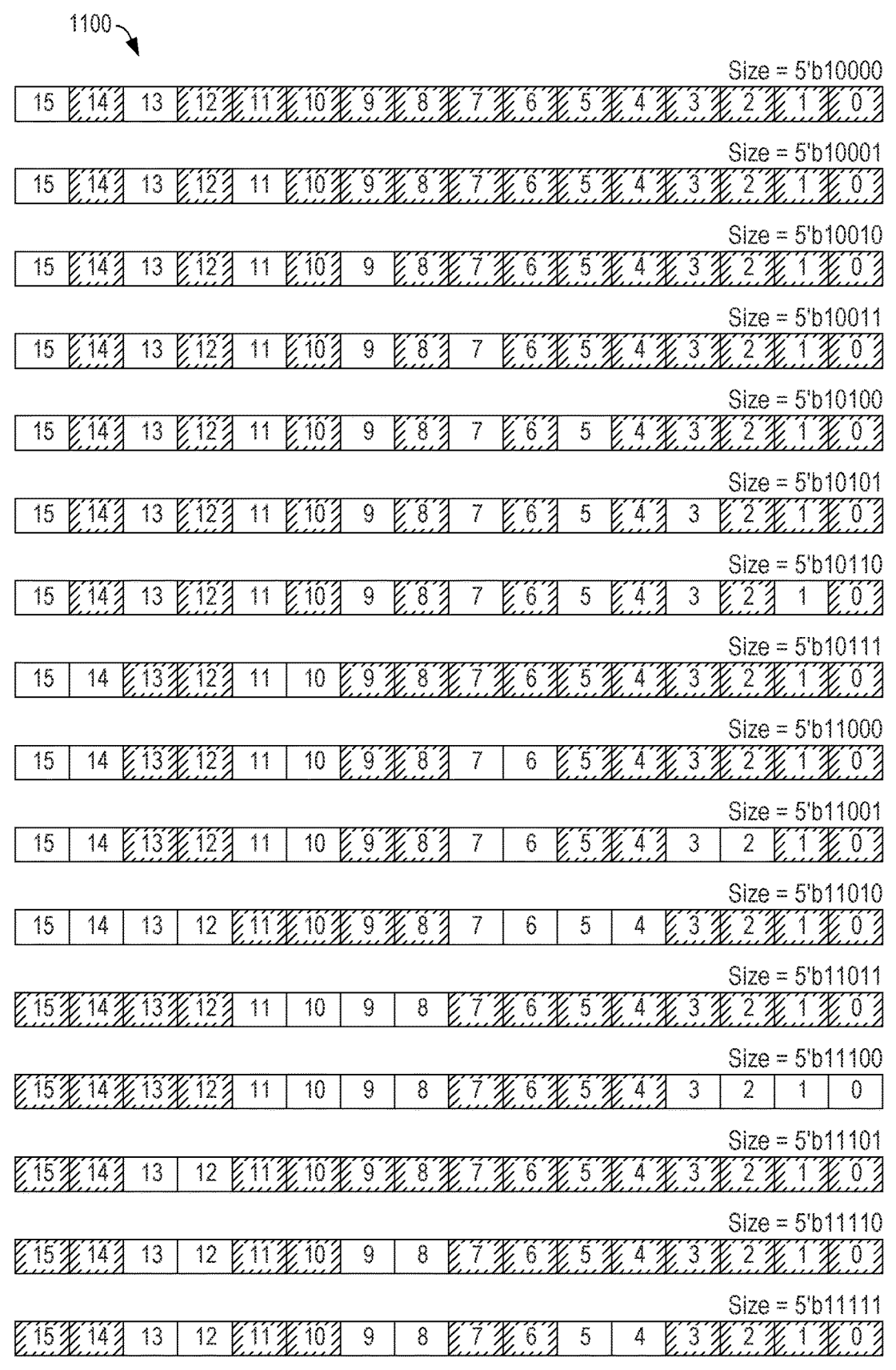

FIG. 11 illustrates stages of a write mask 1100, according to one or more examples. The stages of the write mask 1100 is similar to that of the write mask 900 of FIG. 9, however, the direction that the bits are stored within the write mask 1100 is in an opposite direction to that of the write mask 900. Each stage indicates a stage of the write mask 1000 with a different number of merged store instructions and/or a different size of merged store instructions. In one or more examples, each of the stages may be referred as a different write mask. In one example, a value of a bit (e.g., bit of a direction field) within each buffer location (e.g., the buffer locations 321-328) of a buffer (e.g., the store buffer 320) is used to determine the direction that that the bits within the write mask are stored. In one example, a value of a bit (e.g., bit of a direction field) within each buffer location (e.g., the buffer locations 321-328) of a buffer (e.g., the store buffer 320) is used to determine the direction that that the bits within the write mask are stored. For example, a value of 0 for the bit of a direction field indicates a direction as illustrated in FIG. 9, and a value of 1 for the direction bit indicates a direction as illustrated in FIG. 11. In one or more examples, the bit of the direction field is updated based on a determination as to the direction that the bits within the write mask 900 or 1100 are updated.

Figure 12:
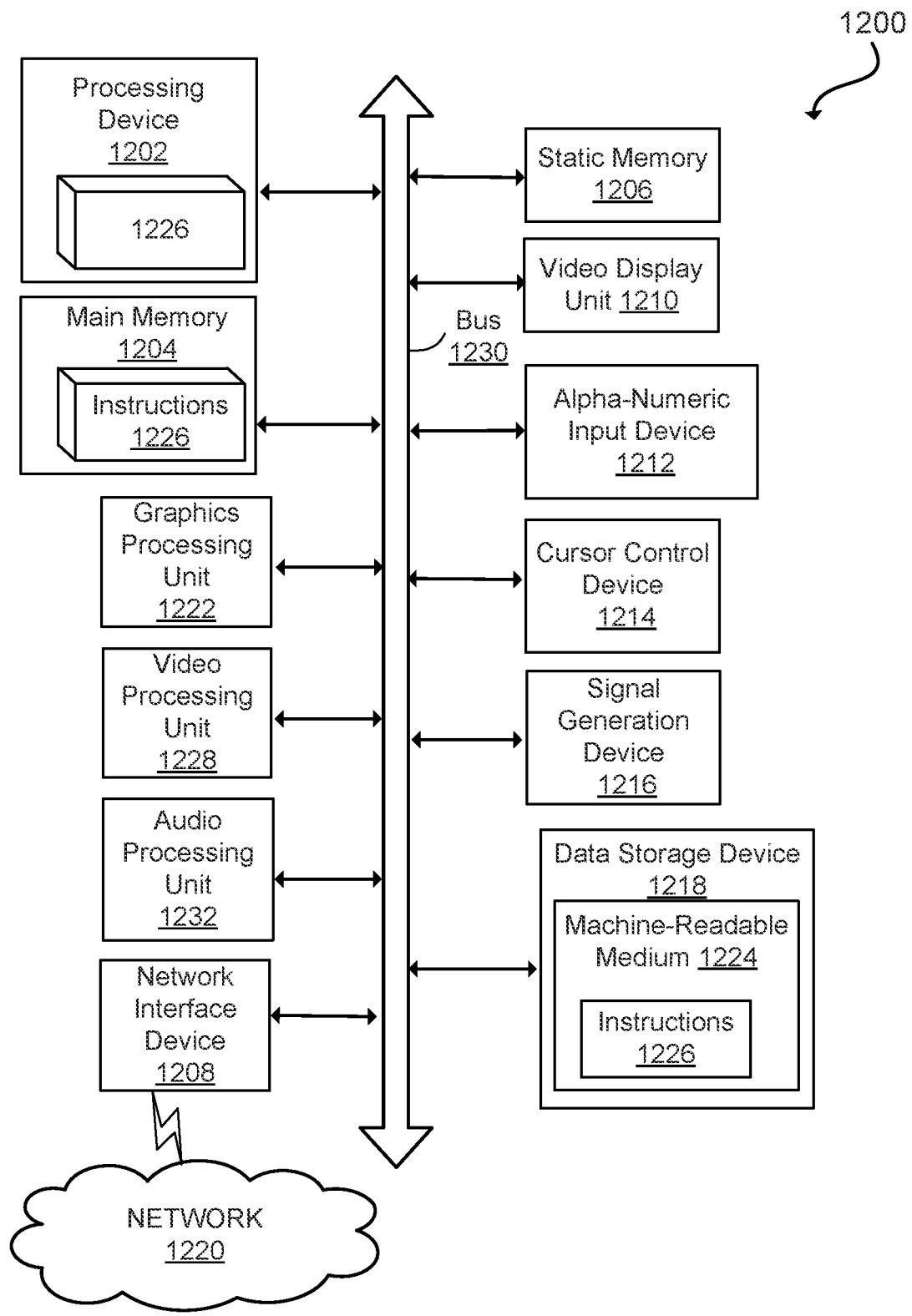
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing system 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing system 1202 represents one or more processors such as a microprocessor, a central processing unit, or the like. More particularly, the processing system may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing system 1202 may also be one or more special-purpose processing systems such as an application specific integrated circuit (ASIC), a field programmable gate array (FPGA), a digital signal processor (DSP), network processor, or the like. The processing system 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing system 1202 during execution thereof by the computer system 1200, the main memory 1204 and the processing system 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing system 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a first store instruction having a first address;
   determining a first pattern based on a comparison of the first address and a second address in an entry within a buffer, wherein the entry comprises a size field comprising a plurality of bits, wherein determining the first pattern comprises determining whether or not an address gap is between the first address and the second address, and wherein the address gap corresponds to one or more addresses between the first address and the second address;
   updating the size field based on the first pattern, wherein first bits of the plurality of bits of the size field are indicative of the first pattern and a second one or more bits of the plurality of bits of the size field is indicative of the address gap between the first address and the second address; and
   merging the first address of the first store instruction with the second address within the entry to generate a merged instruction, wherein the one or more addresses of the address gap are omitted from the merged instruction.

2. The method of claim 1, wherein determining the first pattern comprises:
   determining that the first address is contiguous with the second address.

3. The method of claim 1, wherein determining the first pattern comprises:
   determining that the second address is byte incremental with the first address, and wherein updating the size field comprises updating the size field by one based on determining that the second address is byte incremental with the first address.

4. The method of claim 1, wherein determining the first pattern comprises:
   determining that the second address is half-word incremental with the first address, and wherein updating the size field comprises updating the size field by two based on determining that the second address is half-word incremental with the first address.

5. The method of claim 1, wherein determining the first pattern comprises:
   determining that the second address is word incremental with the first address, and wherein updating the size field comprises updating the size field by four based on determining that the second address is word incremental with the first address.

6. The method of claim 1, wherein determining the first pattern comprises:
determining that the second address is double-word incremental with the first address, and wherein updating the size field comprises updating the size field by eight based on determining that the second address is double-word incremental with the first address.

7. The method of claim 1 further comprising updating a direction field of the entry based on a direction of the first pattern.

8. The method of claim 1 further comprising communicating a transaction corresponding to the merged instruction via a communication bus.

9. The method of claim 1, wherein the address gap corresponds to two or more addresses between the first address and the second address.

10. The method of claim 1, wherein a write mask associated with the merged instruction indicates the first pattern and the address gap between the first address and the second address.

11. The method of claim 10, wherein a first one or more bits of the write mask are associated with the first address, a second one or more bits of the write mask are associated with the second address, and a third one or more bits of the write mask are associated with the one or more addresses of the address gap.

12. A processing system comprising:
a memory;
a processor configured to access the memory via a first store instruction; and
buffer circuitry configured to:
receive the first store instruction having a first address from the processor;
determine a first pattern based on a comparison of the first address and a second address in an entry within a buffer, wherein the entry comprises a size field comprising a plurality of bits, wherein determining the first pattern comprises determining whether or not an address gap is between the first address and the second address, and wherein the address gap corresponds to one or more addresses between the first address and the second address;
update the size field based on the first pattern, wherein first bits of the plurality of bits of the size field are indicative of the first pattern and a second one or more bits of the plurality of bits of the size field is indicative of the address gap between the first address and the second address; and
merge the first address of the first store instruction with the second address in the entry to generate a merged instruction, wherein the one or more addresses of the address gap are omitted from the merged instruction.

13. The processing system of claim 12, wherein determining the first pattern comprises:
determining that the first address is contiguous with the second address.

14. The processing system of claim 12, wherein determining the first pattern comprises:
determining that the second address is byte incremental with the first address, and wherein updating the size field comprises updating the size field by one based on determining that the second address is byte incremental with the first address.

15. The processing system of claim 12, wherein determining the first pattern comprises:
determining that the second address is half-word incremental with the first address, and wherein updating the size field comprises updating the size field by two based on determining that the second address is half-word incremental with the first address.

16. The processing system of claim 12, wherein determining the first pattern comprises:
determining that the second address is word incremental with the first address, and wherein updating the size field comprises updating the size field by four based on determining that the second address is word incremental with the first address.

17. The processing system of claim 12, wherein determining the first pattern comprises:
determining that the second address is double-word incremental with the first address, and wherein updating the size field comprises updating the size field by eight based on determining that the second address is double-word incremental with the first address.

18. The processing system of claim 12, wherein the buffer circuitry is further configured to update a direction field of the entry based on a direction of the first pattern.

19. A buffer circuitry configured to:
receive a first store instruction having a first address;
determine a first pattern based on a comparison of the first address and a second address in an entry of a buffer location, wherein the entry includes a size field comprising a plurality of bits, wherein determining the first pattern comprises determining whether or not an address gap is between the first address and the second address, and wherein the address gap corresponds to one or more addresses between the first address and the second address;
update the size field based on the first pattern, wherein first bits of the plurality of bits of the size field are indicative of the first pattern and a second one or more bits of the plurality of bits of the size field is indicative of the address gap between the first address and the second address; and
merge the first address of the first store instruction with the second address within the entry to generate a merged instruction, wherein the one or more addresses of the address gap are omitted from the merged instruction.

20. The buffer circuitry of claim 19, wherein determining the first pattern comprises at least one of:
determining that the first address is contiguous with the second address;
determining that the second address is byte incremental with the first address, wherein updating the size field comprises updating the size field by one based on determining that the second address is byte incremental with the first address;
determining that the second address is half-word incremental with the first address, wherein updating the size field comprises updating the size field by two based on determining that the second address is half-word incremental with the first address;
determining that the second address is word incremental with the first address, wherein updating the size field comprises updating the size field by four based on determining that the second address is word incremental with the first address; and
determining that the second address is double-word incremental with the first address, and wherein updating the size field comprises updating the size field by eight based on determining that the second address is double-word incremental with the first address.

* * * * *